United States Patent [19]

Hirano

[11] Patent Number: 5,572,366
[45] Date of Patent: Nov. 5, 1996

[54] VARIABLE POWER OPTICAL SYSTEM FOR COPYING MACHINE

[75] Inventor: Hiroyuki Hirano, Tokyo, Japan

[73] Assignee: Asahi Kogaku Kogyo Kabushiki Kaisha, Tokyo, Japan

[21] Appl. No.: 350,463

[22] Filed: Dec. 7, 1994

[30] Foreign Application Priority Data

Dec. 9, 1993 [JP] Japan ................................. 5-309282
Sep. 21, 1994 [JP] Japan ................................. 6-226562

[51] Int. Cl.⁶ ........................................... G02B 15/14
[52] U.S. Cl. ........................................... 359/679
[58] Field of Search ........................... 359/679, 689, 359/686

[56] References Cited

U.S. PATENT DOCUMENTS

| | | |
|---|---|---|
| 4,359,269 | 11/1982 | Itoh . |
| 4,707,082 | 11/1987 | Itoh . |
| 4,735,496 | 4/1988 | Arai . |
| 4,813,773 | 3/1989 | Minefuji . |
| 4,997,265 | 3/1991 | Nishina .................... 359/679 |
| 5,270,864 | 12/1993 | Watanabe ................ 359/679 |

FOREIGN PATENT DOCUMENTS

| | | |
|---|---|---|
| 1123210 | 5/1989 | Japan . |
| 0039918 | 2/1991 | Japan . |
| 4296710 | 10/1992 | Japan . |

*Primary Examiner*—Georgia Y. Epps
*Assistant Examiner*—Jacqueline M. Steady
*Attorney, Agent, or Firm*—Greenblum & Bernstein, P.L.C.

[57] ABSTRACT

A variable power optical system for a copying machine includes a first lens group having a negative power, a second lens group having a positive power, and a third lens group having a negative power. All three lens groups are moved to vary distances $D_1$ and $D_2$ between the first and second lens groups and between the second and third lens groups, to thereby vary the magnification in a range from an actual size to an enlargement range, while maintaining a constant distance between an object and an object image. In the range from the actual size to the enlargement range, the optical system satisfies the relationship defined by $0.60<|(D_{m1}-D_{e1})/(D_{m2}-D_{e2})|<0.85$, wherein "$D_{mi}$" designates a value of $D_i$ (i=1,2) at a maximum magnification, and "$D_{ei}$" designates a value of $D_i$ (i=1,2) at an actual size, respectively.

12 Claims, 7 Drawing Sheets

VARIABLE POWER OPTICAL SYSTEM FOR COPYING MACHINE

BACKGROUND OF THE INVENTION

1. Field of the invention

The present invention relates to a variable power optical system used in a copying machine.

2. Description of Related Art

As is well known, it is preferable that a variable power optical system for a copying machine, which is mainly used at an actual size image or full size image (magnification is approximately 1) is in a symmetrical arrangement because it is not necessary to take into account a transverse chromatic aberration or distortion. In a symmetrical arrangement, a curvature of field or a coma (comatic aberration) tends to occur. To prevent this, it is known that the symmetrical arrangement can be changed to an asymmetrical arrangement upon varying the magnifying power to thereby correct the curvature of the field or the coma, as disclosed for example in Japanese Unexamined Patent Publication Nos. 1-123210 or 4-296710. However, depending on the degree of asymmetry, a transverse chromatic aberration or a coma is caused. This results in a decrease in the contrast or deterioration of the image quality.

SUMMARY OF THE INVENTION

Accordingly, it is an object of the present invention to provide an inexpensive variable power optical system for a copying machine in which the transverse chromatic aberration can be effectively restricted and the curvature of the field can be corrected, particularly at an enlargement range.

To achieve the object mentioned above, according to an aspect of the present invention, there is provided a variable power optical system for a copying machine, which includes a first lens group having a negative power, a second lens group having a positive power, and a third lens group having a negative power, wherein the three lens groups are moved to vary a distance $D_1$ between the first and second lens groups and a distance $D_1$ between the second and third lens groups to thereby vary the magnification from a reduction range including an actual size range to an enlargement range, while keeping a constant distance between an object to be copied and an image of the object. The variable power optical system satisfies a relationship defined by the following formula (1) in the range from the actual size range to the enlargement range:

$$0.60 < |(D_{m1} - D_{e1})/(D_{m2} - D_{e2})| < 0.85, \quad (1)$$

where "$D_{mi}$" designates the value of $D_i$ (i=1, 2) at the maximum magnification, and "$D_{ei}$" designates the value of $D_i$ (i=1,2) at the actual size, respectively.

Preferably, the second lens group includes a plurality of lenses in a symmetrical arrangement with respect to the center of the second lens group. Both the first and third lens groups are made of a single lens and have a similar shape. The first and third lens groups are preferably located in a substantially symmetrical arrangement with respect to the second lens group at the actual size range.

Preferably, the first and third lens groups satisfy the relationship defined by the following formula (2):

$$v_d > 60, \quad (2)$$

wherein "$v_d$" designates an Abbe number of the first and third lens group.

The second lens group can be made of more than four lenses in a perfectly symmetrical arrangement with respect to a center of the second lens group.

According to another aspect of the present invention, the optical system satisfies a relationship defined by the following formula (3) in the range from the actual size range to the reduction range:

$$0.3 < |(D_{r2} - D_{e2})/(D_{r1} - D_{e1})/| < 1.0, \quad (3)$$

wherein, "$D_{ri}$" designates the value of $D_i$ (i=1, 2) at the maximum reduction, and "$D_{ei}$" designates the value of $D_i$ (i=1,2) at the actual size, respectively.

Figure 13:
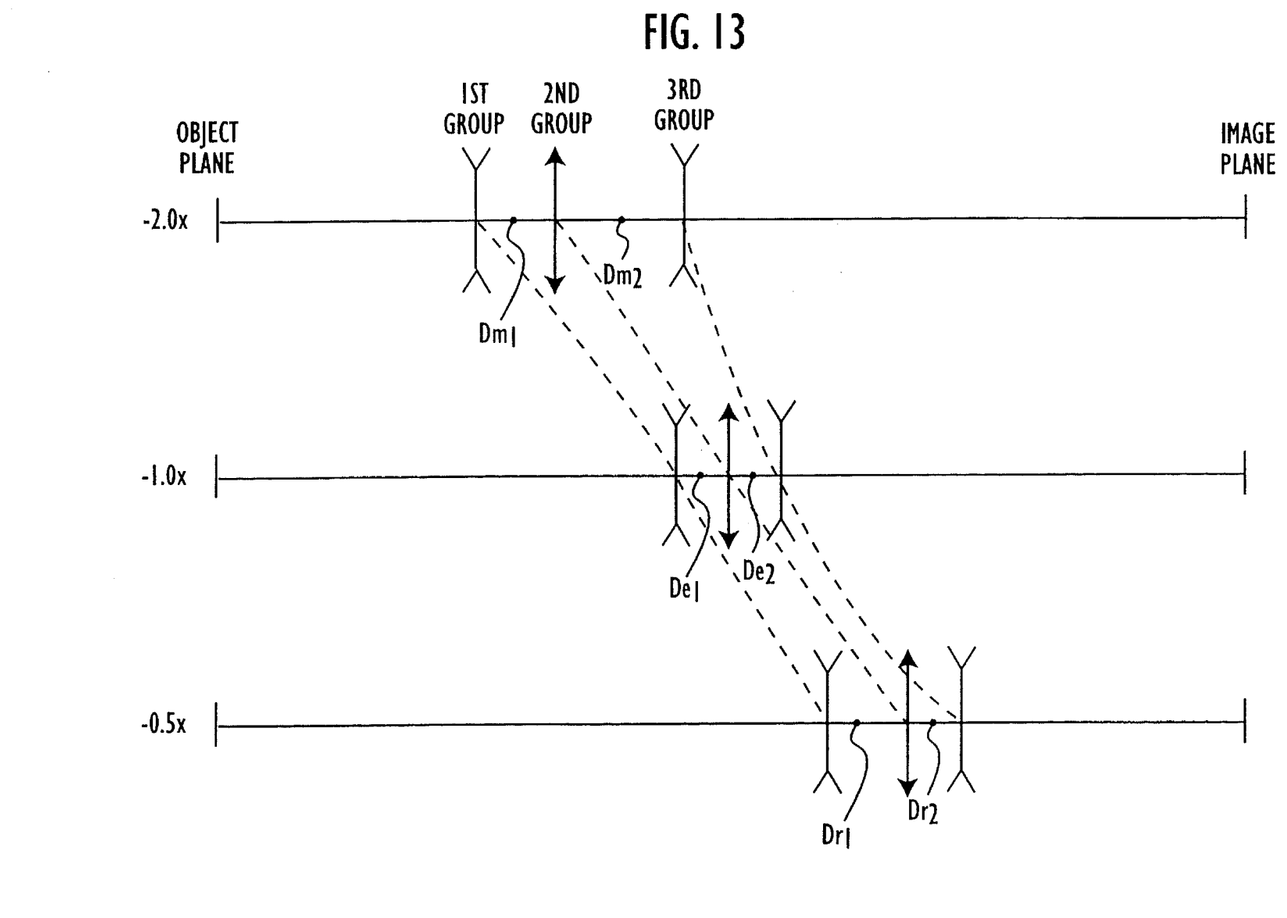
FIG. 13 is a schematic view of the movement of lens groups of an optical system from a reduction range to an enlargement range, according to the present invention.

The values of $D_i$ ($D_{mi}$, $D_{ei}$, $D_{ri}$) in the formulae mentioned above are shown in FIG. 13.

The present disclosure relates to subject matter contained in Japanese Patent Application Nos. 5-309282 (filed on Dec. 9, 1993) and 6-226562 (filed on Sep. 21, 1994) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

A variable power optical system for a copier according to the present invention includes three lens groups, a first lens group having a negative power, a second lens group having a positive power, and a third lens group having a negative power. Upon varying the magnifying power, the distance between the first and second lens groups and the distance between the second and third lens groups, at an enlargement range are defined by formula (1). Consequently, an inexpensive optical system having a variable magnifying power can be obtained, in which not only can the transverse chromatic aberration and the comatic aberration at the enlargement range be effectively restricted, but also a curvature of the field can be corrected.

If the value of the ratio defined in formula (1) exceeds an upper limit to be close to 1, the transverse chromatic aberration can be corrected but it is difficult to sufficiently correct the field of curvature. If the ratio is below the lower limit, the transverse chromatic aberration is too large to correct.

In a variable power optical system according to the present invention, it is desirable that each of the first and third lens groups is made of a plurality of lenses to be made individually achromatic. However, this increases the manufacturing cost and the weight of the lens system. To satisfy both incompatible requirements, the first and third lens groups are preferably the same in shape and located in a symmetrical arrangement (opposed to each other).

In theory, the main lens group (i.e., the second lens group) can be made of a minimum number of lenses, i.e., three lenses, to curtail the manufacturing cost. However, if the three lenses are located in a symmetrical arrangement, a good optical performance (or image quality) can be obtained only in a limited magnification range or angle of view. The same would be true for four lenses. To obtain a good optical performance within a magnifying range from approximately 0.5 to 2.0, it is preferable to make the second lens group of at least five lenses. In the case of five lenses, even the symmetrical arrangement ensures a good optical performance.

If the second lens group is made of five lenses, there is a lens at the center of the lens system (second lens group). Consequently, the center lens would interfere with a variable diaphragm or a color separating filter, etc. In this case, the center lens is preferably split into two lenses, so that there are six lenses in total. The image quality obtained by the six-lens arrangement is substantially the same as that of the five-lens arrangement.

Moreover, the variable power optical system satisfies formula (3) in the reduction range. If the ratio defined in formula (3) exceeds an upper limit, the displacement of the third lens group relative to the second lens group is larger than the displacement of the first lens group relative to the third lens group. This is advantageous from the viewpoint of mechanical design, but a curvature of the field is caused and an under-corrected astigmatism occurs. If the ratio is below the lower limit in formula (3), an over correction of the curvature of the field takes place, and a coma is caused, thus resulting in a deteriorated image quality. Moreover, the diameter of the first lens group is increased.

Two embodiments of the invention will be discussed below.

First Embodiment

FIGS. 1 through 6 show a first embodiment of a variable power optical system for a copying machine, according to the present invention.

Figure 1:
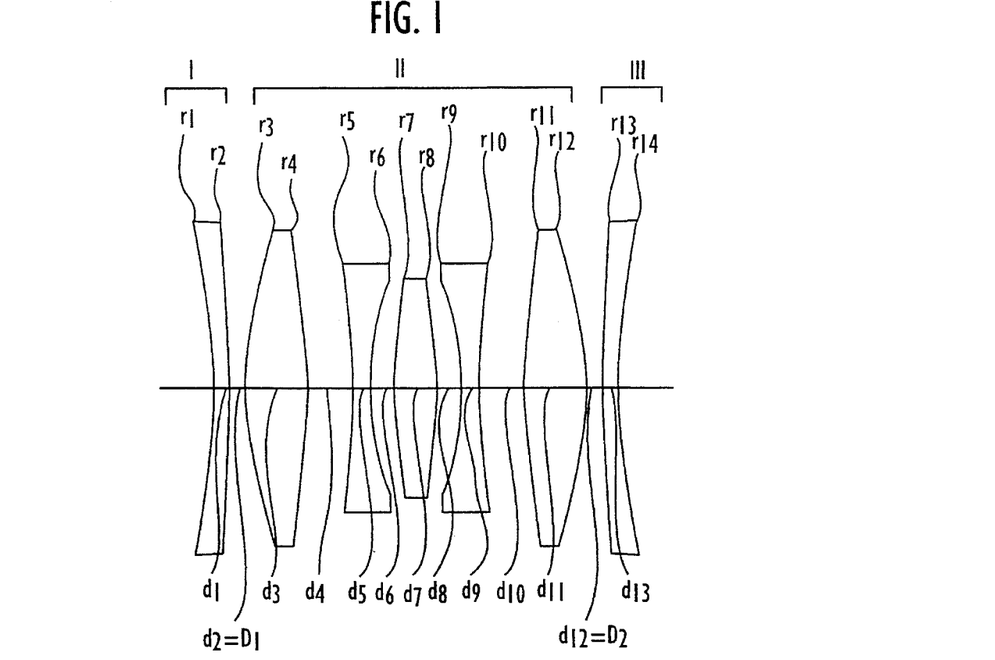
FIG. 1 is a schematic view of a lens arrangement of a variable power optical system for a copier at −1.0X, according to a first embodiment of the present invention.
Figure 3:
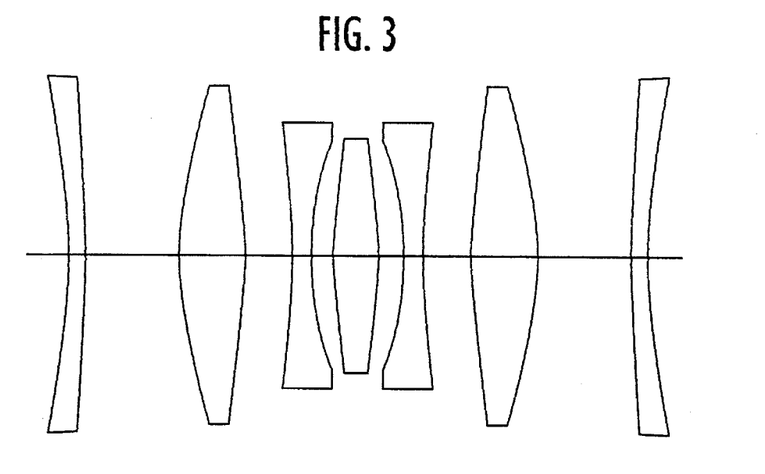
FIG. 3 is a schematic view of a lens arrangement of a variable power optical system at −2.0X, according to the first embodiment of the present invention.
Figure 5:
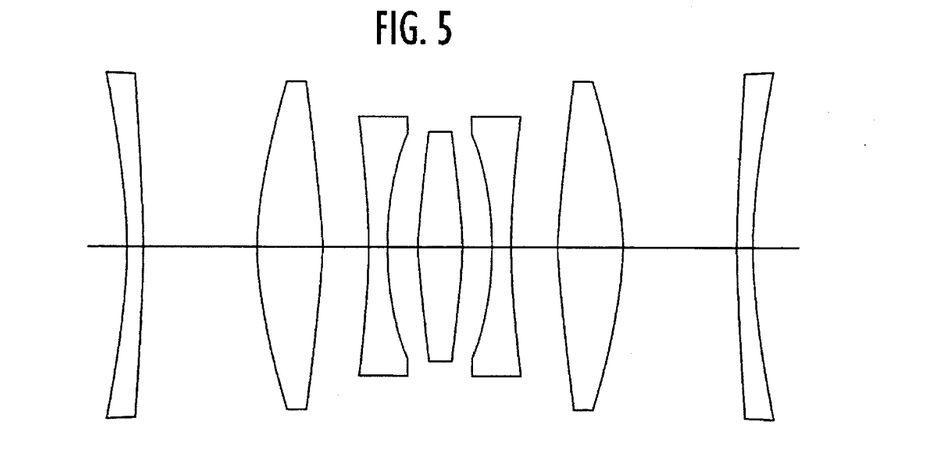
FIG. 5 is a schematic view of a lens arrangement of a variable power optical system at −0.5X, according to the first embodiment of the present invention.

Numerical data of the optical system is shown in Table 1 below. Lens arrangements of the optical system at $-1.0X$, $-2.0X$ and $-0.5X$ are shown in FIGS. 1, 3 and 5, respectively. In the first embodiment, first lens group I and third lens group III are each made of a single lens. Second lens group II is made of five lenses which are located in a symmetrical arrangement with respect to the center of the second lens group.

Figure 2:
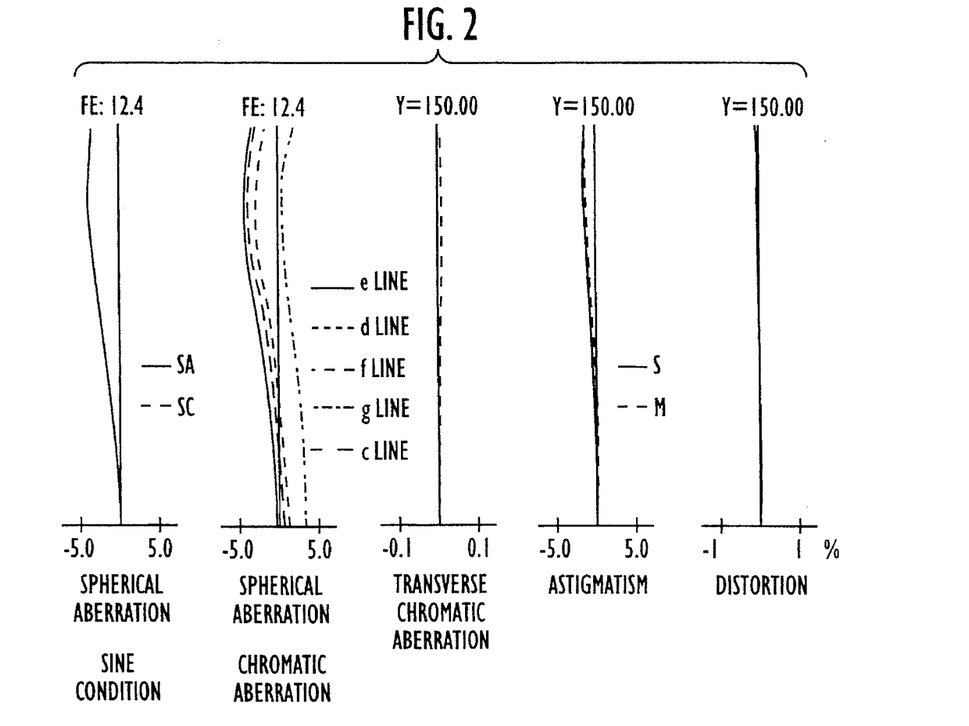
FIG. 2 shows various aberration diagrams of the optical system shown in FIG. 1.
Figure 4:
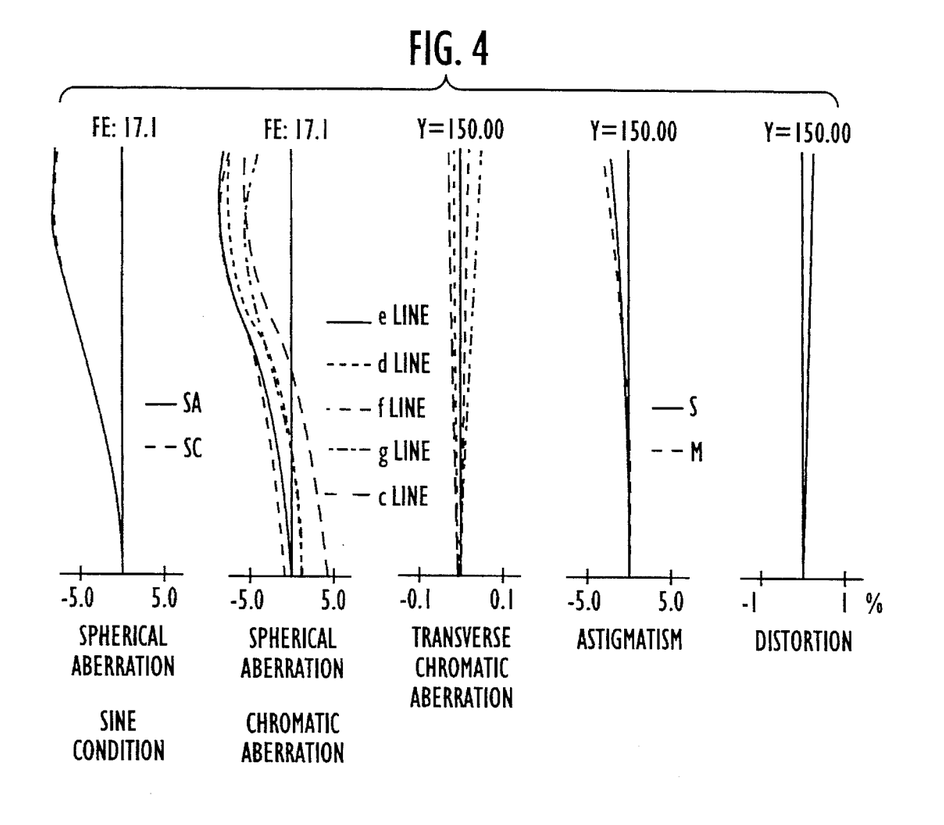
FIG. 4 shows various aberration diagrams of the optical system shown in FIG. 3.
Figure 6:
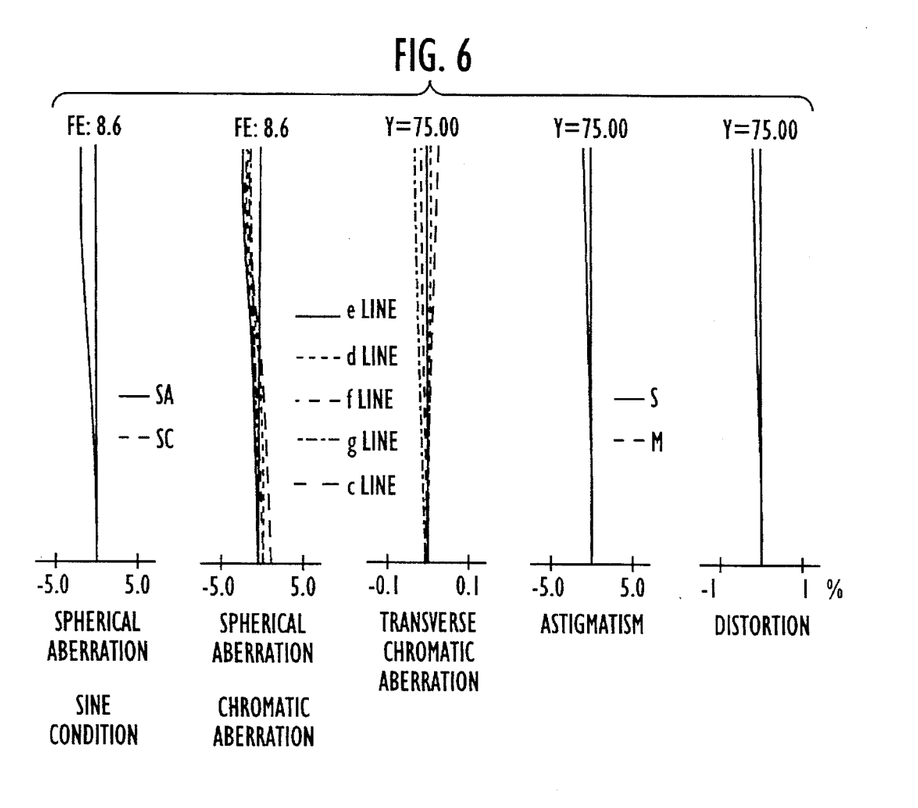
FIG. 6 shows various aberration diagrams of the optical system shown in FIG. 5.

Diagrams of various aberrations of the optical system at $-1.0X$, $-2.0X$ and $-0.5X$ are shown in FIGS. 2, 4 and 6, respectively. In these diagrams, "SA" designates a spherical aberration, "SC" designates a sine condition, "e-line", "d-line", "F-line", "g-line", and "C-line" designates chromatic aberration represented by a spherical aberration and transverse chromatic aberration, at respective wavelengths, "S" designates a the sagittal ray, and "M" designates a meridional ray, respectively.

In Table 1 and the drawings, "$F_e$" designates an effective f-number, "f" designates a focal length, "M" designates a magnification, "R" designates a radius of curvature, "D" designates a thicknesses of the lens or distance between the lenses, "$N_e$" the refractive index of the e-line, "$N_d$" the refractive index of the d-line, and "$v_d$" designates an Abbe number of the d-line, respectively.

TABLE 1

$F_e = 12.4–17.1–8.6$
$f = 263.98–233.49–233.47$
$M = -1.000—2.000—0.500$

| surface No. | R | D | $N_e$ | $N_d$ | $v_d$ |
|---|---|---|---|---|---|
| 1 | −107.460 | 2.80 | 1.51825 | 1.51633 | 64.1 |
| 2 | −272.500 | 2.00–13.90–18.85 | — | — | — |
|  |  | (−1.0x)–(−2.0x)–(−0.5x) |  |  |  |
| 3 | 81.262 | 10.15 | 1.66152 | 1.65844 | 50.9 |
| 4 | −161.880 | 8.15 | — | — | — |
| 5 | −130.000 | 3.42 | 1.63004 | 1.62588 | 35.7 |
| 6 | 64.350 | 4.01 | — | — | — |
| 7 | 113.000 | 7.60 | 1.72794 | 1.72342 | 38.0 |
| 8 | −113.000 | 4.01 | — | — | — |
| 9 | −64.350 | 3.42 | 1.63004 | 1.62588 | 35.7 |
| 10 | 130.000 | 8.15 | — | — | — |
| 11 | 161.880 | 10.15 | 1.66152 | 1.65844 | 50.9 |
| 12 | −81.262 | 3.08–17.36–12.44 | — | — | — |
|  |  | (−1.0x)–(−2.0x)–(−0.5x) |  |  |  |

TABLE 1-continued $F_e = 12.4–17.1–8.6$
$f = 263.98–233.49–233.47$
$M = -1.000—2.000—0.500$

| surface No. | R | D | $N_e$ | $N_d$ | $v_d$ |
|---|---|---|---|---|---|
| 13 | 272.500 | 2.80 | 1.51825 | 1.51633 | 64.1 |
| 14 | 107.460 | — | — | — | — |

Second Embodiment

Figure 7:
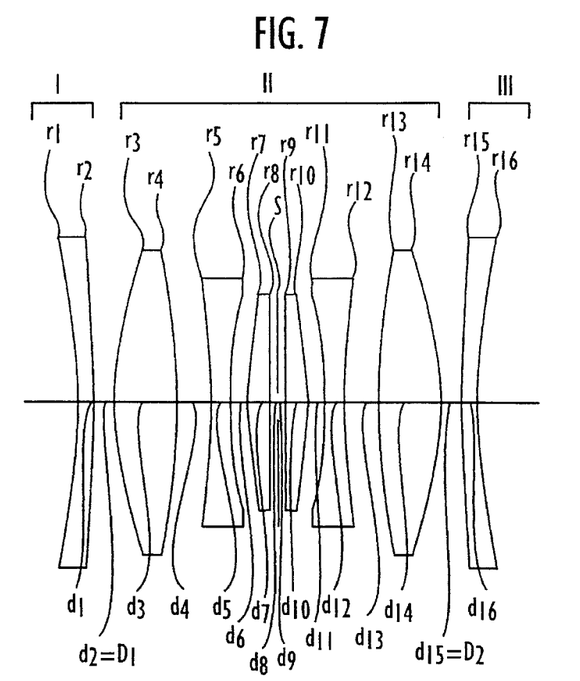
FIG. 7 is a schematic view of a lens arrangement of a variable power optical system for a copier at −1.0X, according to a second embodiment of the present invention.
Figure 8:
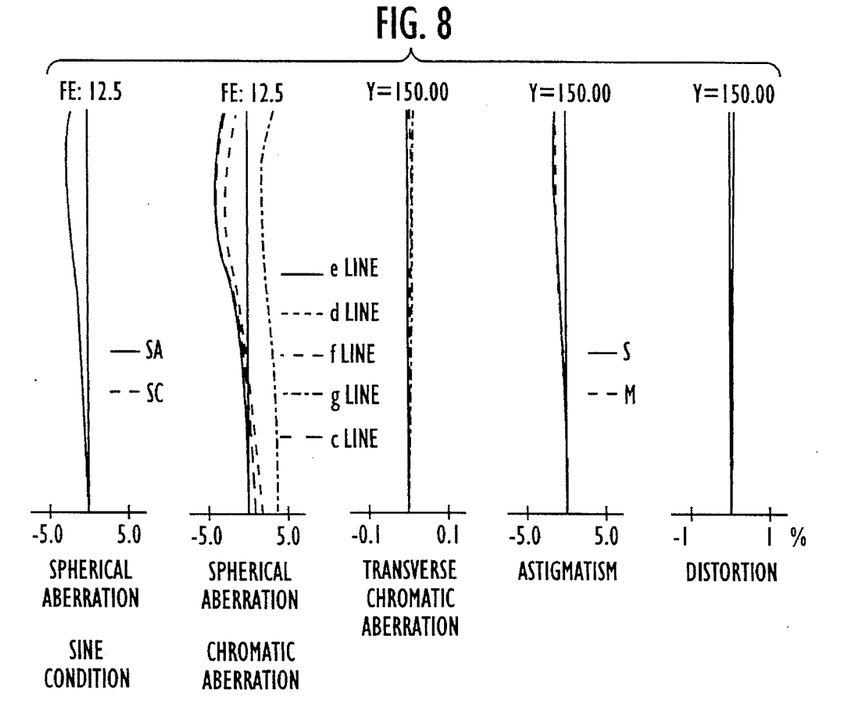
FIG. 8 shows various aberration diagrams of the optical system shown in FIG. 7.
Figure 9:
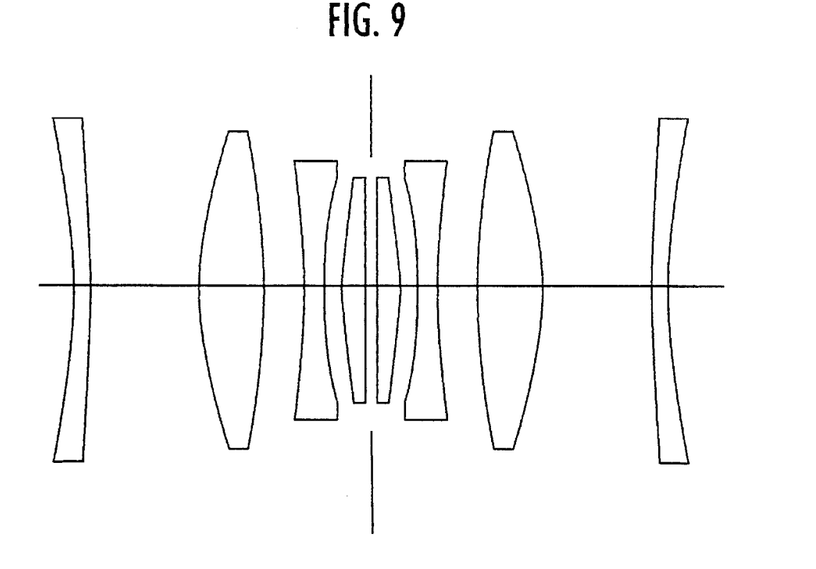
FIG. 9 is a schematic view of a lens arrangement of a variable power optical system at −2.0X, according to the second embodiment of the present invention.
Figure 10:
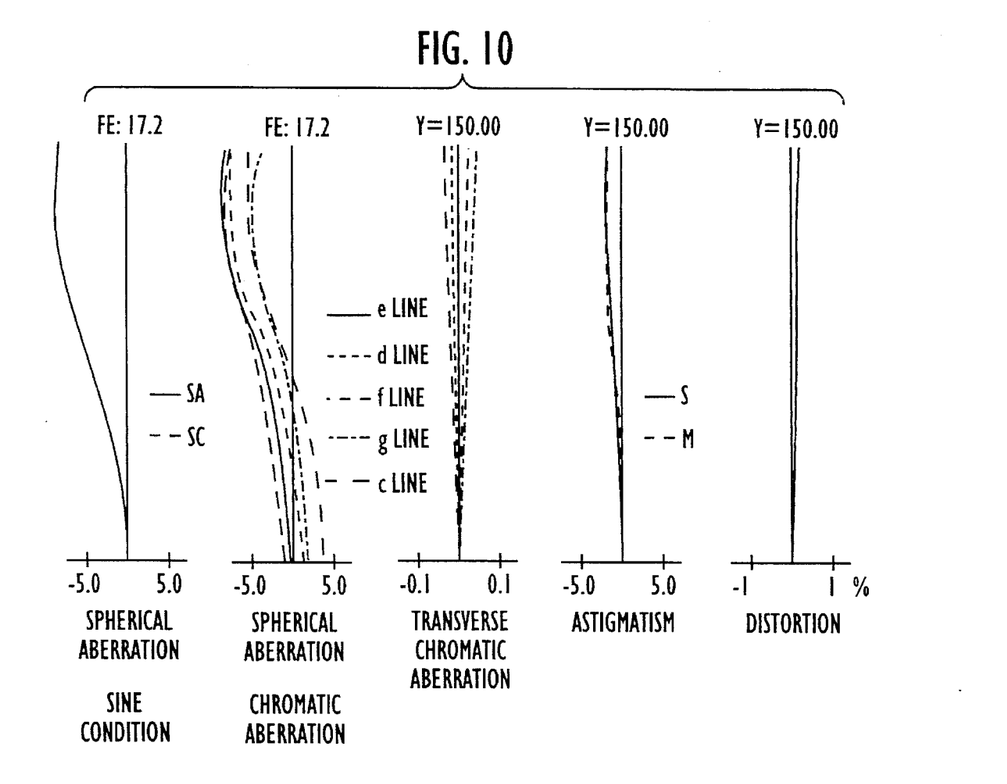
FIG. 10 shows various aberration diagrams of an optical system shown in FIG. 9.
Figure 11:
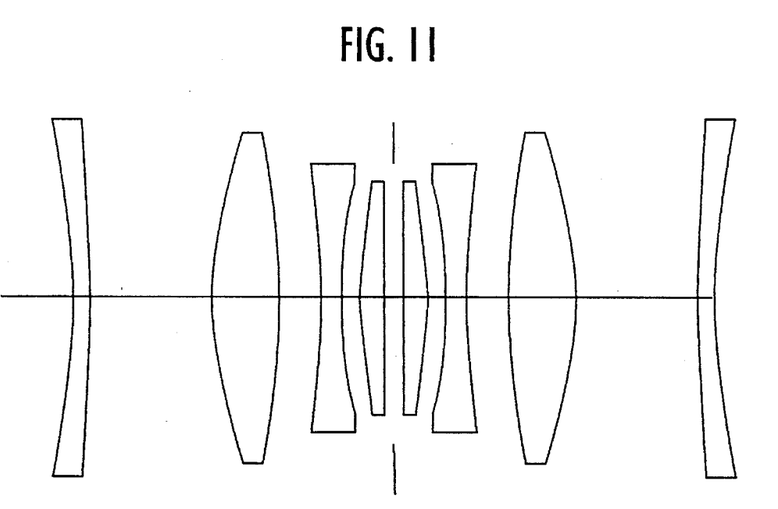
FIG. 11 is a schematic view of a lens arrangement of a variable power optical system at −0.5X, according to the second embodiment of the present invention.
Figure 12:
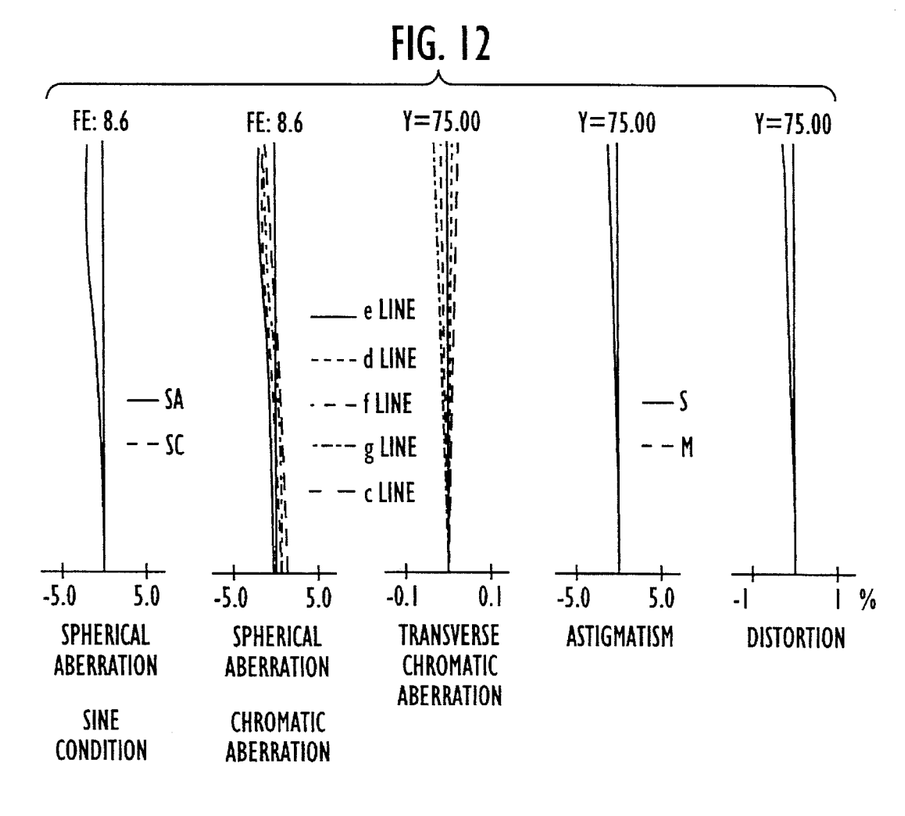
FIG. 12 shows various aberration diagrams of the optical system shown in FIG. 11.

FIGS. 7 through 12 show a second embodiment of a variable power optical system for a copying machine, according to the present invention. In the second embodiment, second lens group II is made of six lenses. There is a diaphragm S at the center of the second lens group II. The other structure of the second embodiment is the same as the first embodiment. Numerical data of the optical system in the second embodiment is shown in Table 2 below. Lens arrangements of the optical system at −1.0X, −2.0X and −0.5X are shown in FIGS. 7, 9 and 11, respectively. Diagrams of various aberrations thereof at −1.0X, −2.0X and −0.5X are shown in FIGS. 8, 10 and 12, respectively.

TABLE 2

$F_e = 12.5–17.2–8.6$
$f = 263.86–233.36–233.36$
$M = -1.000—2.000—0.5000$

| surface No. | R | D | $N_e$ | $N_d$ | $v_d$ |
|---|---|---|---|---|---|
| 1 | −107.346 | 2.80 | 1.51825 | 1.51633 | 64.1 |
| 2 | −272.652 | 2.00–12.90–19.09 (−1.0×)–(−2.0×)–(−0.5×) | — | — | — |
| 3 | 81.197 | 10.16 | 1.66152 | 1.65844 | 50.9 |
| 4 | −161.842 | 8.28 | — | — | — |
| 5 | −129.898 | 2.52 | 1.63004 | 1.62588 | 35.7 |
| 6 | 64.386 | 3.66 | — | — | — |
| 7 | 112.975 | 3.28 | 1.72794 | 1.72342 | 38.0 |
| 8 | ∞ | 1.00 | — | — | — |
| STOP | ∞ | 1.00 | — | — | — |
| 9 | ∞ | 3.28 | 1.72794 | 1.72342 | 38.0 |
| 10 | −112.975 | 3.66 | — | — | — |
| 11 | −64.386 | 2.52 | 1.63004 | 1.62588 | 35.7 |
| 12 | 129.898 | 8.28 | — | — | — |
| 13 | 161.842 | 10.16 | 1.66152 | 1.65844 | 50.9 |
| 14 | −81.197 | 3.78–19.04–12.84 (−1.0×)–(−2.0×)–(−0.5×) | — | — | — |
| 15 | 272.652 | 2.80 | 1.51825 | 1.51633 | 64.1 |
| 16 | 107.346 | — | — | — | — |

The values of formulae (1) through (3) in the first and second embodiments are shown in Table 3 below.

TABLE 3

| | Embodiment 1 | Embodiment 2 |
|---|---|---|
| formula (1) | 0.833 | 0.714 |
| formula (2) | 64.1 | 64.1 |
| formula (3) | 0.556 | 0.530 |

As can be seen from Table 3 above, both embodiments satisfy the requirements defined by formulae (1) through (3). Moreover, according to the present invention, the various aberrations when the magnification is 2x, 1x or 0.5x can be correctly compensated. In particular, the transverse chromatic aberration can be corrected when the magnification is 2.

As can be seen from the above discussion, according to the present invention, an inexpensive magnifying optical system for a copying machine, in which the transverse chromatic aberration can be corrected, particularly in the enlargement range and the curvature of the field can be corrected can be obtained.

I claim:

1. A variable power optical system for a copying machine, comprising:

a first lens group having a negative power;

a second lens group having a positive power; and a third lens group having a negative power;

wherein the three lens groups are moved to vary a distance $D_1$ between said first and second lens groups and a distance $D_2$ between said second and third lens groups to vary a magnification from a reduction range to an enlargement range and including an actual size, while keeping a constant distance between an object to be copied and an image of the object, said second lens group comprising a plurality of lenses, a distance between each lens of said plurality of lenses being maintained substantially constant during said varying of said magnification, and wherein said variable power optical system satisfies a relationship defined by the following formula in said range from said actual size to said enlargement range:

$$0.60 < |(D_{m1}-D_{e1})/(D_{m2}-D_{e2})| < 0.85,$$

wherein "$D_{mi}$" designates a value of $D_i$ (i=1, 2) at said maximum magnification, and "$D_{ei}$" designates a value of $D_i$ (i=1,2) at said actual size, respectively.

2. A variable power optical system according to claim 1, wherein said second lens group comprises a plurality of lenses in a symmetrical arrangement with respect to a center of the second lens group.

3. A variable power optical system according to claim 2, wherein each of said first and third lens groups comprise a single lens and have a similar shape, and wherein said first and third lens groups are located in a substantially symmetrical arrangement with respect to said second lens group at said actual size range.

4. A variable power optical system according to claim 3, wherein said first and third lens groups satisfy a relationship defined by the following formula:

$$v_d > 60,$$

wherein "$v_d$" designates an Abbe number of said first and third lens groups.

5. A variable power optical system according to claim 1, wherein said second lens group comprises more than four lenses in a symmetrical arrangement with respect to a center of said second lens group.

6. A variable power optical system according to claim 1, wherein said variable power optical system satisfies a relationship defined by the following formula in a range from said actual size to said reduction range:

$$0.3 < |(D_{r2}-D_{e2})/(D_{r1}-D_{e1})| < 1.0,$$

wherein "$D_{ri}$" designates a value of $D_i$ (i=1, 2) at said maximum reduction, and "$D_{ei}$" designates a value of $D_i$ (i=1,2) at said actual size, respectively.

7. The variable power optical system of claim 1, wherein said first lens group and said third lens group are located in an asymmetrical arrangement with respect to said second lens group at said enlargement range.

8. The variable power optical system of claim 6, wherein said first lens group and said third lens group are located in an asymmetrical arrangement with respect to said second lens group at said enlargement range.

9. A variable power optical system for a copying machine, comprising:

a first lens group having a negative power;

a plurality of lenses that form a second lens group having a positive power; and a third lens group having a negative power, wherein a distance between each lens of said plurality of lenses are maintained substantially constant during a varying of a magnification, said variable power optical system satisfying a relationship defined by the following formula in a range from an actual size to an enlargement range:

$$0.60 < |(D_{m1}-D_{e1})/(D_{m2}-D_{e2})| < 0.85,$$

wherein:

"$D_{mi}$" designates a value of $D_i$ (i=1,2) at a maximum magnification, and

"$D_{ei}$" designates a value of $D_i$ (i=1, 2) at said actual size, respectively.

10. The variable power optical system of claim 9, wherein said first lens group and said third lens group are located in an asymmetrical arrangement with respect to said second lens group at said enlargement range.

11. The variable power optical system of claim 10, wherein said first lens group, said second lens group and said third lens group are arranged such that a distance $D_1$ between said first lens group and said second lens group, and a distance $D_2$ between said second lens group and said third lens group vary to change a magnification from a reduction range to said enlargement range while keeping a constant distance between an object to be copied and an image of the object.

12. The variable power optical system of claim 9, wherein said variable power optical system satisfies a relationship defined by the following formula in a range from said actual size to said reduction range:

$$0.3 < |(D_{r2}-D_{e2})/(D_{r1}-D_{e1})| < 1.0,$$

wherein "$D_{ri}$" designates a value of $D_i$ (i=1,2) at said maximum reduction, and "$D_{ei}$" designates a value of $D_i$ (i=1,2) at said actual size, respectively.

* * * * *